Nov. 23, 1926. Re. 16,482
L. S. LACHMAN
METALLIC STRUCTURE
Original Filed May 8, 1916 2 Sheets-Sheet 1
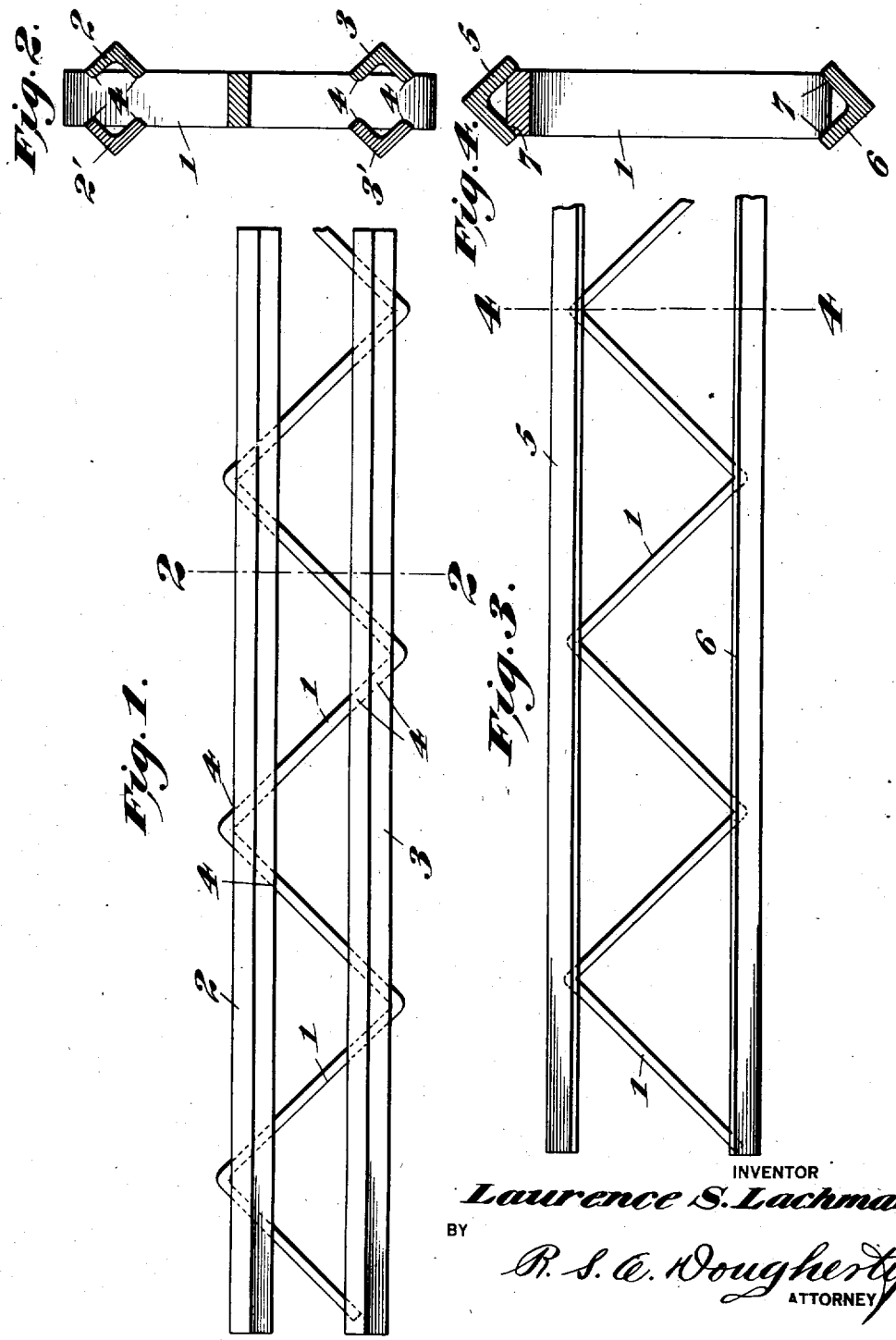
INVENTOR
Laurence S. Lachman.
BY
R. S. C. Dougherty
ATTORNEY Nov. 23, 1926. Re. 16,482

L. S. LACHMAN

METALLIC STRUCTURE

Original Filed May 8, 1916 2 Sheets-Sheet 2

INVENTOR

Laurence S. Lachman.

BY R. S. C. Dougherty

ATTORNEY

Reissued Nov. 23, 1926.

Re. 16,482

UNITED STATES PATENT OFFICE.

LAURENCE S. LACHMAN, OF FOREST HILLS, NEW YORK, ASSIGNOR, BY MESNE ASSIGNMENTS, TO BETHLEHEM STEEL COMPANY, A CORPORATION OF PENNSYLVANIA.

METALLIC STRUCTURE.

Original No. 1,300,740, dated April 15, 1919, Serial No. 96,021, filed May 8, 1916. Application for reissue filed August 31, 1926. Serial No. 132,850.

This invention relates to metallic truss structures for use as girders, frames or other purposes for which the structures may be employed.

The object of the invention is to provide a strong, simple structure of intersecting metallic members which can be quickly and cheaply assembled and joined together.

The invention consists essentially of a metallic truss in which a zig-zag middle member is electrically welded at, or near, its bends to oppositely disposed, flanged chords by means of edge to edge or edge to surface contact.

In the accompanying drawing illustrating embodiments of my invention, Figure 1 is a front elevation of a structure or frame constructed in accordance with one form of this invention.

Fig. 2 is an end elevation of the same.

Fig. 3 is a front elevation of another form of structure in accordance with this invention.

Fig. 4 is an end elevation of the same.

Referring particularly to Figs. 1 and 2 of the drawings, 1 indicates a zigzag metallic member preferably formed continuous from end to end and of any desired width, the metal strip from which the member is formed being bent at the desired places so that adjoining legs will form any desired angle with each other.

The said member 1 is held between pairs of longitudinal members 2—2′ and 3—3′ each pair engaging opposite edges of the middle member 1 near the corners or turns of the zigzag arrangement. The longitudinal bars 2—2′, 3—3′ are angle or V-shaped in cross-section and placed in contact with the edges of the zigzag member 1 by engaging said edges by both free edges along the open side of the V-shaped bars whereby each bar intersects the edge of the member 1 at two places.

In this position the parts are secured together preferably by electrically welding them at the points of intersection, a weld being formed at each of the points 4. Upon being softened by the electric heating, and upon pressure being applied, the metal of the contacting portions more or less interpenetrate. The penetrating action of the edges of the V bends is particularly effective, as they act like wedges to enter the metal of the middle member. This type of welding is very resistant against shear and other stresses. Then too, in this form of the invention each bar makes four welds in the vicinity of each bend.

Referring to Figs. 3, 4, 5 and 6, the longitudinal bars 5, 6 contact with the corners or turns of the zigzag member 1 and are welded thereto at such points of intersection. In this case the longitudinal bars which are preferably V-shaped straddle the corners or turns of the zigzag members, the edges of the members contacting with the surface or edge of the V bars. At these contacting points indicated at 7 the parts are electrically welded together, two welds being formed at each corner or turn with each bar. In this embodiment the wedge like action during the welding operation, to effect penetration of one member by another, is furnished by the edges of the middle member.

Figure 6:
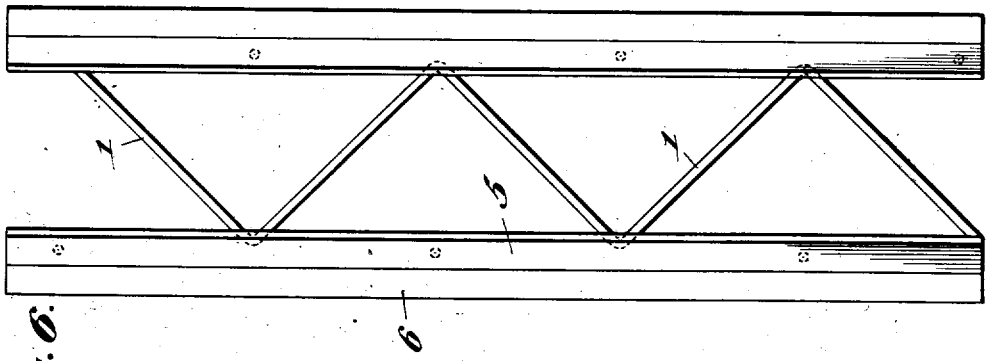
Fig. 6 is a side elevation on a reduced scale of the column illustrated in Fig. 5.
Figure 5:
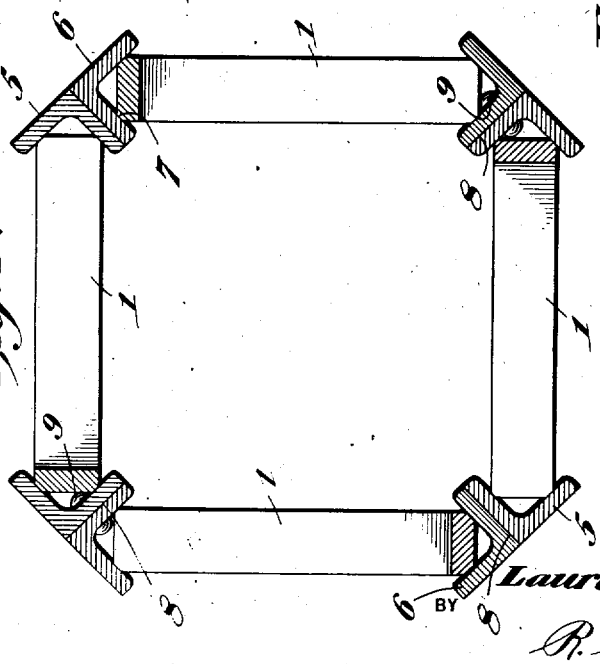
Fig. 5 is a plan view or transverse section through a pole or column constructed by using the frame illustrated in Fig. 3 as side members.

A column or pole may be readily constructed of members formed as shown in Figs. 3 and 4 by arranging the structure upright as illustrated in Fig. 6 and bringing the face of one of the flanges of the V-shaped bar into flat contact with a flange of the bar of another unit as indicated at 8 in Fig. 5. The meeting flanges of the bars 5 and 6 may then be secured together in any desired manner along the meeting surfaces, as by rivets or bolts 9 in the spaces between the legs of the members 1 or by spot welding the bars at such places or otherwise.

Figure 8:
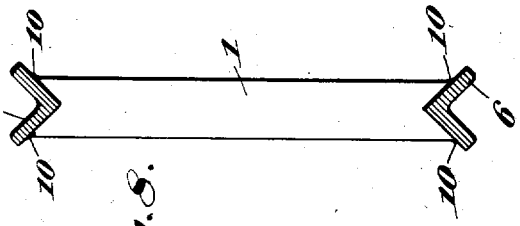
Fig. 7 is a front elevation of a structure illustrating a further embodiment of the invention and Fig. 8 is a transverse vertical section through the same.
Figure 7:
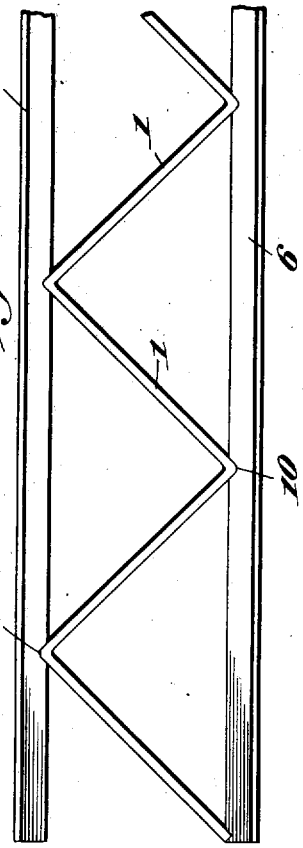

Referring to the form illustrated in Figs. 7 and 8, the V-shaped longitudinal bars 5 and 6 engage the corners or turns of the zigzag member 1 by their apexes so that but one point of contact is made between the bars and each turn or corner. At the contacting points the members are electrically welded to each other, the apex of the V bars sinking into the metal at the turn of the zigzag member and said member spreading out along the sides of the V bars as indicated more clearly at 10 in Fig. 8.

In each of the embodiments of the invention, which have been described, there is a zigzag middle member, electrically welded at, or near, its bends to flanged and longitudinal members. The flanged character of the chord members is especially important. Not only does it furnish strength to the structure because of the strength inherent in a flanged element, but, because of it the members are adapted to cooperate to furnish an edge to edge or an edge to surface contact, each involving a wedge like penetration of one member by another during the welding operation.

What I claim as my invention is:

1. A metallic structure comprising a zigzag middle member and a pair of flanged longitudinal members spaced apart by said middle member with the flanges thereof engaging and intersecting the edges of the middle member and welded thereto.

2. A metal structure comprising a zigzag middle member and a pair of V-shaped longitudinal bars spaced apart by said middle member with the free edges intersecting the edges of the middle member near the turns thereof, said bars being welded to the middle member at the intersecting points, thereby forming four welds between each bar and the middle member.

In testimony whereof I hereunto affix my signature.

LAURENCE S. LACHMAN.